UNITED STATES PATENT OFFICE.

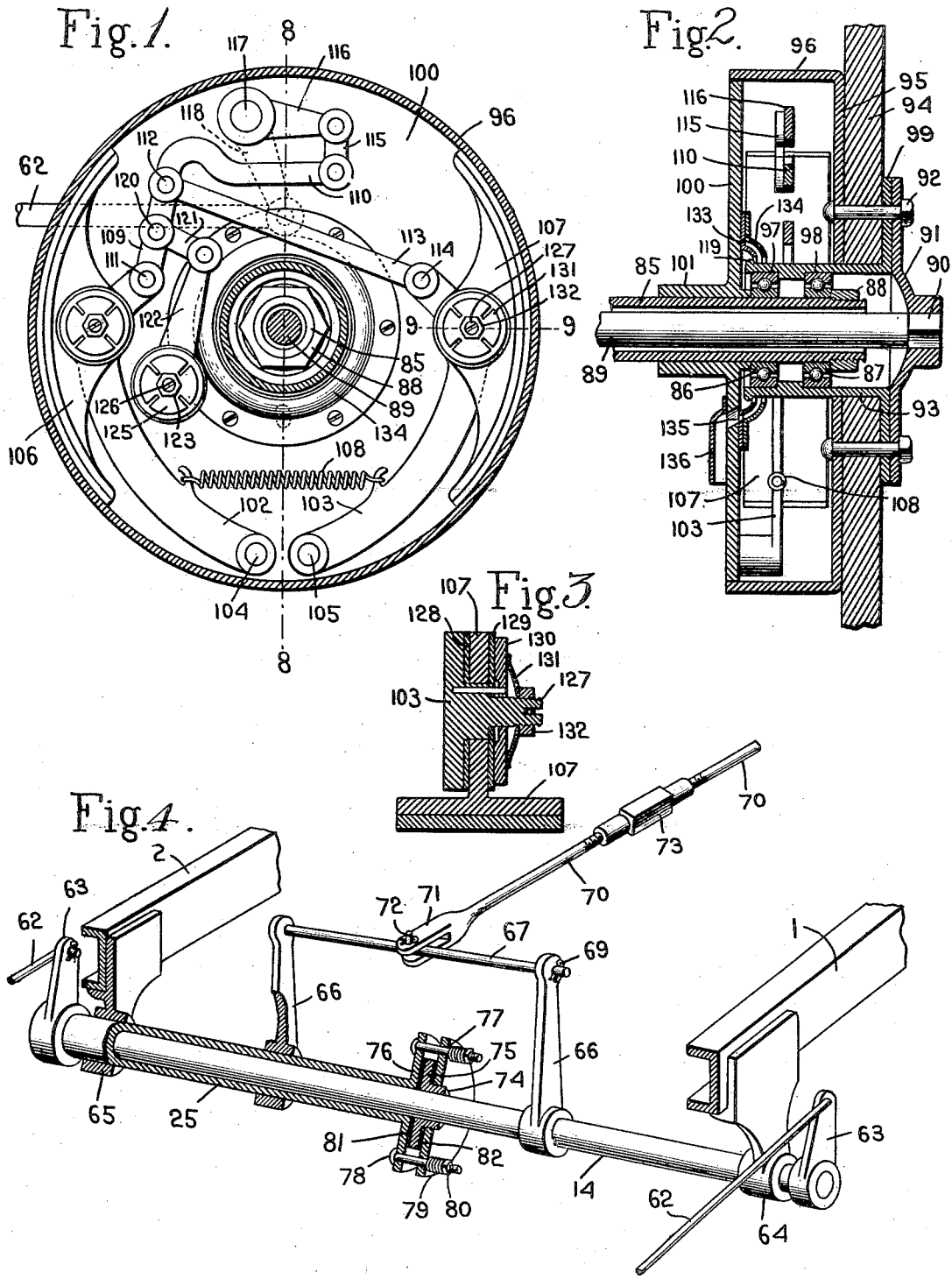

RALPH M. LOVEJOY, OF MEREDITH, NEW HAMPSHIRE.

BRAKE.

1,363,607. Specification of Letters Patent. Patented Dec. 28, 1920.

Application filed August 31, 1916. Serial No. 117,952.

*To all whom it may concern:*

Be it known that I, RALPH M. LOVEJOY, a citizen of the United States, and resident of Meredith, county of Belknap, State of New Hampshire, have invented an Improvement in Brakes, of which the following description, in connection with the accompanying drawing, is a specification, like characters on the drawing representing like parts.

This invention relates to certain improvements in brakes, particularly those used in automobile construction and the general object of the invention is to provide an improved mechanism which will insure a more effective braking action and a quick and certain release of the brake when the power which actuates the braking mechanism is withdrawn.

Another object of the invention is to provide a brake construction which will permit automatic equilization of the force applied to the brakes and which will cause simultaneous release of both brakes when the brake applying force is removed.

A further object of the invention is to improve the structure of the brake itself, to insure instant and simultaneous removal of the brake shoes of each brake from its brake drum when the brake applying force is removed.

Another object of the invention is to provide means which will permit automatic adjustment of each brake shoe to the brake drum upon the application of the brake applying force and which will cause both ends of the brake shoe to be withdrawn simultaneously from contact with the brake drum so that dragging of the shoe upon the brake drum which frequently occurs in usual constructions will be avoided.

Other objects and features of the invention will more fully appear from the following description and the accompanying drawing and will be particularly pointed out in the annexed claims.

The drawings illustrate a preferred embodiment of my invention as applied to the braking mechanism of an automobile.

Figure 1 is a side elevation of the brake mechanism with the brake drum shown in section, Fig. 2 is a vertical sectional view on the lines 8—8 Fig. 1.

Fig. 3 is a sectional detail view of the friction device for maintaining automatic adjustment of the brake shoe on the line 9, 9, Fig. 1, and, Fig. 4 is a perspective view with a part broken away of the brake shaft and means for controlling the application, release and adjustment.

In usual automobile constructions in which independent brakes are simultaneously applied to a pair of wheels, usually the rear wheels, considerable unevenness results from improperly releasing the brakes. While such devices ordinarily are provided with equalizers which are intended to cause the simultaneous removal of the brake shoes from the pair of wheels, frequently one of the brake shoes will wear more rapidly than the other, and one portion of the equalizing mechanism will move more freely than the other, so that as a matter of fact the brake shoes of one brake will be completely removed while the other still remains in engagement with its brake drum, thus causing a dragging which retards the speed of the vehicle and a chattering which is annoying to the occupants.

One of the principal objects of the invention is to provide means for automatically adjusting the brakes which are applied to the respective wheels in such a manner that the brakes of both wheels will be simultaneously and completely removed from contact with their respective brake drums upon the release of the brake applying power.

A further object of the invention is to provide automatic means which will insure the removal of both ends of the brake shoe from the brake drum simultaneously even in case one end of the brake shoe wears away more rapidly than the other.

A preferred form of mechanism embodying the present invention comprises brake rods 62 which are connected to arms 63 secured to the ends of a brake shaft 14, which preferably is constructed in two telescoping sections 14 and 25, the portion 14 being in the form of a cylindrical rod journaled in a suitable bracket 64 depending from the side rail 1 of the frame and passing telescopically through the other section or sleeve 25 which is journaled in a suitable bracket 65 secured to and depending from the side rail 2. Arms 66 are rigidly secured to the sections 14, 25 respectively and are connected by an equalizing bar 67 passing through apertures in the ends of said arms and secured therein by cotter pins 69 or other suitable fastenings. Any suitable mechanism may be provided for moving the equalizing bar 67.

As illustrated herein a link rod 70 having a bifurcated end 71 pivotally connected by a pin 72 to the central portion of the bar serves as a means through which power may be applied through the foot lever to the equalizing bar 67.

Desirably the rod 70 is made in two sections connected by a turn buckle 73 to provide for proper adjustment of the rod and the foot lever (not shown) and also to enable the rod 70 to be shortened as the brake shoes wear.

By this construction which so far described is of a usual character the force applied to the equalizer 67 serves to rotate the shaft sections 14—25 in unison. It also permits a greater movement of one or the other to apply the brakes upon both wheels with equal force. Where such movement is caused by the equalizer, one of the brakes is likely not to be restored to normal position upon the removal of the brake applying force and the brake consequently is likely to drag in its drum.

By the present invention I have provided means whereby a relative movement between the sections 14—25 of the brake shaft is permitted during the power applying operation but the sections of said shaft are connected together with sufficient force to cause both sections to rotate in the reverse direction in unison, thereby insuring the proper removal of the brakes for both wheels. This is accomplished by providing a frictional connection between the shaft sections. A preferred construction comprises a collar 74 rigidly secured by a pin or otherwise to the shaft 14 and having an annular flange or disk 75 extending at right angles to the axis of the shaft, embraced by a pair of frictional disks upon the tubular section 25 of the brake shaft. One of these coöperating frictional disks 76 may be formed by flanging the end of the tubular shaft 25 or by welding or otherwise securing a suitable disk thereto. The other frictional member preferably is in the form of a disk or ring 77 having a central aperture of sufficient size to slip over the collar 74.

The member 77 is secured to the disk 76 by bolts 78 passing through the apertures in said disks beyond the periphery of the disk 75. Resilient means such as springs 79 interposed between the disk 77 and nuts 80 on the bolts 78 serve to force the frictional disks 76—77 together and upon the disk 75 with the desired amount of force which may be adjusted by screwing up or unscrewing the nuts 80. Fiber washers 81—82 preferably are inserted respectively between the disks 75, 76 and 75, 77. In the operation of the mechanism, force applied to the rod 70 and through it to the equalizer 67 will serve to set the brake shoes against the brake drum and if one of the brakes is improperly positioned or is worn, this application of power will cause a sufficient relative rotation between the brake shaft sections 14, 25 to cause the brake shoes to be applied equally.

In such case the friction disks permit relative rotative movement of the sections 14, 25 of the brake shaft but when the brake applying power is removed the friction between the disks 75, 76 and 77 is sufficient to prevent relative rotative movement of the shaft sections, so that the springs which remove the brake shoes on one of the brakes from engagement with its drum will also cause the removal of the brake shoes of the other brake from its drum, thus effectively releasing the brakes of both wheels simultaneously.

This action will occur even if the brake shoes of the respective brakes of a pair of brakes wear unevenly. This mechanism very greatly facilitates the assembling of the machine for whereas in ordinary brake constructions the greatest of care has to be taken to adjust the brakes so that they will release properly, the present mechanism automatically positions the brakes properly through the equalizer to positively cause their proper release under all running conditions.

In usual brake constructions the brake drum is engaged by diametrically oppositely disposed brake shoes which are pivoted upon arms secured to a stationary support or disk within said drum and the shoes are applied to the drum through a lever engaging directly or through a link both of said brake shoes. Where one of the brake shoes releases more rapidly than the other or where there is an imperfect adjustment of the lever and link, one of the shoes is likely to be withdrawn upon the release of the brake applying power without the removal of the other brake shoe.

Another important object of the present invention is to provide means which will insure the simultaneous and complete removal of both of the brake shoes from contact with the drum immediately upon the removal of the brake applying power.

Another difficulty which frequently occurs, arises from the fact that the pivotal connection between the brake shoe and its supporting arm becomes loose and permits one end of the brake shoe to drag upon the drum.

Another feature of the invention consists in providing a frictional means adapted normally to prevent rotative movement of the brake upon its pivot which will yield under the application of the brake applying force to permit the brake shoe properly to coöperate with the drum. This means further enables the brake shoe to accommodate itself to the drum until the entire frictional surface of the shoe is worn out.

The preferred form of brake mechanism is illustrated herein as applied to an automobile rear axle 85 which is tubular in form and is provided adjacent its ends with ball raceways 86, 87 which are properly spaced apart and secured thereon by a nut 88 threaded upon the end of the tubular axle.

The driving shaft 89 extends freely through the axle 85 and has a squared end 90 which engages and is secured to a cap 91 which in turn is secured by bolts 92 to the hub 93 in the wheel. The bolts 92 desirably pass through the flange 99 of the hub 93 and thence through the spokes 94 and also the hub 95 of the brake drum 96 so that the drum is securely fastened to the wheel. Ball raceways 97—98 carried upon the interior of the hub coöperate with the raceways 86—87 to provide the usual form of ball bearing for the wheel.

The brake shoes are mounted upon a relatively stationary support within the brake drum. As illustrated herein the stationary support is in the form of a disk 100 having a hub 101 fixedly secured to the tubular axle 85. The periphery of the disk desirably fits closely within the edge of the cylindrical portion 96 of the brake drum so as to exclude dust from the interior thereof. Arms 102 and 103 mounted upon pivotal studs or lugs 104, 105 projecting from or secured to the hub 101 of the drum serve to support the brake shoes 106 and 107. A helical spring 108 connected at its end to said arm 102, 103 serves normally to withhold the brake shoes from engagement with the interior cylindrical surface of the brake drum. The brake shoes 106 and 107 are applied to the drum through a system of levers actuated by the brake rod 62 which in turn is actuated from the brake shaft in the manner above described. The brake shoe actuating mechanism illustrated herein comprises a lever 110 pivotally connected to a stud 111 on the end of the arm 102 which supports the brake shoe 106. The lever 110 is provided with a stud 112 to which is connected one end of a link 113, the opposite end of which is pivotally mounted upon a stud 114 at the end of the arm 103 which carries the brake shoe 107.

The end of the lever 110 is connected by a link 115 to the end of the arm 116 of a bell crank lever having a shaft 117 extending through and journaled in the disk 100, the opposite end 118 of said bell crank lever being connected to the brake rod 62. By reason of this construction the lever 110 and link 113 form a sort of toggle construction so that the actuation of the lever 110 by the means described will force the brake shoes 106 and 107 simultaneously against the inner periphery of the drum 96.

The construction thus far described is not uncommon in automobile brakes but it is found that when the brake applying force is removed one of the brakes is likely to be released from its engagement with the drum, while the other brake will drag slightly.

In order to overcome this defect I have provided the lever 110 with a pivotal stud 120 which is connected by a link 121 to the end of an arm 122 which is pivotally mounted upon a stud 123 extending upwardly from the disk 100. The arm 122 is provided with an enlarged portion surrounding the stud 123 and a frictional washer 125 adjustably forced upon the enlarged portion of said arm by an adjustable nut 126 serves to retain the arm 122 normally in a fixed position. Such frictional engagement however is not sufficient to prevent the moving of the arm by the power applied through the brake rod 62 so that in the normal operation of the brake the arm 122 will yield as the brakes 106 and 107 are applied to the brake band through the lever 110, thus causing the pivot 120 upon the arm 122 to be properly positioned when the brake shoes are in engagement with the drum.

When the arm is released the spring 108 acts to remove the brake shoes from engagement with the drum. Under such circumstances the lever 110 is oscillated about the pivotal stud 120 which is retained in its proper position by the friction imposed upon the arm 122 so that both brake shoes will be removed simultaneously from engagement with the inner periphery of the drum.

In order to prevent the brake shoes from becoming loose upon their pivots and thereby dragging upon the drum a frictional device is provided which will prevent any loose pivotal movement. This mechanism may be similar to that described for resisting the movement of the arm 122. In the particular mechanism which is illustrated herein, the arms 102 and 103 which are identical in form are each provided with an integral stud 127 which extends through the web of the brake shoe 107. Frictional disks 128 and 129 placed upon opposite sides of the web of the brake shoe 107 are clamped frictionally against said web by a disk 130 which is forced against the same by a spring washer 131 mounted upon the stud 127 and adjustable thereon by a nut 132. By reason of this construction each brake shoe is enabled to adjust itself automatically in proper relation to the interior of the drum and will be prevented from displacement from said position by said frictional mechanism when the brake shoe is withdrawn from engagement with the drum.

If the brake shoe wears faster upon one end than upon the other, the force applied to the shoe will cause it automatically to assume a proper position and when once in such position to be retained by said frictional mechanism.

It will be noted that by reason of the various equalizing and balancing mechanisms thus embodied in the brake itself and in the brake shaft, I have so perfected the operation of the brake that both brake shoes of both brakes will be simultaneously and completely released from engagement with the brake drums upon removal or release of the brake applying force.

A further improvement in the braking mechanism consists in providing means for preventing oil which is used to lubricate the bearing between the axle and the wheel from entering the drum. This is accomplished in the preferred form of the invention illustrated herein by providing the inner end of the hub 93 with an external annular flange 119 and surrounding said flange with one or preferably two dished plates 133, 134, the plate 133 being so positioned as to catch oil which may be thrown from the flange 119 by centrifugal force and the plate 134 so located as to catch any oil which may have escaped from the plate 133. A suitable aperture 135 in the disk 100 communicating with the recess between said plates and between said plates and said hub provides means for discharging from the casing the oil thus accumulated. A cover 136 may be provided to prevent dust from entering the aperture 135.

It will be understood that the features of the invention disclosed herein are illustrative in character and are not restrictive and that various modifications therein may be made within the spirit and scope of the following claims.

Having thus described my invention what I claim as new and desire to secure by Letters Patent is;

1. In combination with a vehicle having brakes adapted to be applied to a pair of wheels, actuating means for simultaneously operating said brakes including relatively movable members connected to the respective brakes and provided with coöperating frictional surfaces adapted automatically to insure the simultaneous release of both brakes.

2. The combination with a vehicle having brakes adapted to be applied to a pair of wheels, a manually operable connecting rod, relatively movable members connected to said connecting rod and to the respective brakes and frictional means engaging said relatively movable members operating automatically to insure the simultaneous release of both brakes.

3. In combination with a vehicle having brakes adapted to be applied to a pair of wheels, a sectional brake shaft, means connecting the sections thereof respectively to said brakes, means for simultaneously actuating the sections of said brake shaft to apply said brakes and means upon said shaft sections presenting coöperating faces acting to insure simultaneous release of both brakes.

4. In combination with a vehicle having brakes adapted to be applied to a pair of wheels, a sectional brake shaft, means connecting the sections thereof respectively to said brakes, means for simultaneously oscillating the sections of said brake shaft to apply said brakes and frictional means connecting said sections whereby simultaneous and complete release of the pair of brakes is insured.

5. In combination with a vehicle having brakes adapted to be applied to a pair of wheels, a brake shaft having telescoping sections provided with arms connected by brake rods to said brakes, actuating arms for said sections, an equalizer connecting said actuating arms, means for applying power to said equalizer and coöperating frictional means carried by said brake shaft sections adapted to permit relative rotative movement of said sections under the influence of the power applied thereto in setting the brakes but adapted to cause said sections to rotate together when the brake applying force is withdrawn, thereby insuring simultaneous release of said brakes.

6. In combination with a vehicle having brakes adapted to be applied to a pair of wheels, a brake shaft having telescoping sections provided with arms connected by brake rods to said brakes, actuating arms for said sections, an equalizer connecting said actuating arms, means for applying power to said equalizer and adjustable coöperating frictional disks carried by said brake shaft sections adapted to permit relative rotative movement of said sections under the influence of the power applied thereto in setting the brakes but adapted to cause said sections to rotate together when the brake applying force is withdrawn, thereby insuring simultaneous release of said brakes.

7. In combination with a vehicle having brakes adapted to be applied to a pair of wheels, a brake shaft having telescoping sections provided with arms connected by brake rods to said brakes, actuating arms for said sections, an equalizer connected to said actuating arms, means for applying power to said equalizer, a frictional disk secured to one section of said brake shaft and embraced by a pair of frictional disks secured to the other section of said brake shaft and connected by adjustable resilient means, whereby said frictional disks will permit relative rotative movement of said brake shaft sections under the influence of power applied through said equalizer in setting the brakes but will cause said sections to rotate together when the brake applying power is released, thereby insuring simultaneous release of said brakes and preventing dragging.

8. A brake for vehicles including brake drums connected to a pair of the vehicle wheels, stationary supports upon said drums, arms carrying brake shoes pivoted upon said supports, means for actuating said arms to apply said brake shoes to said drums and friction means for causing equal and simultaneous release of said brake shoes from said drums upon the removal of the brake applying force.

9. A brake for vehicles comprising a cylindrical brake drum adapted to be secured to a wheel, a relatively stationary supporting member upon said drum, arms carrying brake shoes pivotally mounted upon said stationary supporting member, a spring connecting said arms adapted normally to withhold said brake shoes from contact with said drum, a lever connected to said arms, means for actuating said lever to apply said brake shoes to said drum, a pivot for said lever intermediate of the connections from said lever to said brake shoes and frictional means for automatically adjusting said pivot to cause said brake shoes to be withdrawn simultaneously from said brake drum upon release of the brake applying power.

10. A brake for vehicles comprising a cylindrical brake drum adapted to be secured to a wheel, a relatively stationary supporting member within said drum, arms carrying brake shoes pivotally mounted upon said stationary supporting member, a spring connecting said arms adapted normally to withhold said brake shoes from contact with said drum, a lever connected to said arms, means for actuating said lever to apply said brake shoes to said drum, a pivot for said lever intermediate of the connections from said lever to said brake shoes, a pivotally mounted arm connected to the pivot of said lever and frictional instrumentality engaging said arm adapted to permit it to be moved by the brake applying force but to prevent it from movement upon release of said force whereby said spring will cause simultaneous and complete withdrawal of said brake shoes from contact with said drum.

11. A brake for vehicles comprising a cylindrical brake drum adapted to be secured to a wheel, a relatively stationary supporting member within said drum, arms carrying brake shoes pivotally mounted upon said stationary supporting member, a spring connecting said arms adapted normally to withhold said brake shoes from contact with said drum, a lever connected to said arms, means for actuating said lever to apply said brake shoes to said drum, a pivot for said lever intermediate of the connections from said lever to said brake shoes, a pivotally mounted arm connected to the pivot of said lever and frictional instrumentality engaging said arm adapted to permit it to be moved by the brake applying force but to prevent it from movement upon release of said force whereby said spring will cause simultaneous and complete withdrawal of said brake shoes from contact with said drum, and means for adjusting said frictional instrumentality to regulate properly the relative movement of said brake shoes.

12. A brake for vehicles comprising a cylindrical drum adapted to be secured to a wheel, a stationary supporting member within said drum, arms pivoted to said member, brake shoes pivotally connected to said arms, frictional means for normally preventing movement of said brake shoes about their pivots, a spring connecting said arms normally tending to withhold the brake shoes from engagement with said drum and means for transmitting force to said brake shoe supporting arms to apply said brake shoes whereby the frictionally controlled pivotal connection of said brake shoes to said arms may permit automatic adjustment of the brake shoes to the drum and will thereafter prevent displacement of said brake shoes upon said arms when they are withdrawn.

13. A brake for vehicles comprising a cylindrical drum adapted to be secured to a wheel, a stationary supporting member within said drum, arms pivoted to said member, brake shoes pivotally connected to said arms, frictional washers mounted upon the pivots of said brake shoes for normally preventing movement of said brake shoes about their pivots, a spring connecting said arms normally tending to withhold the brake shoes from engagement with said drum and means for transmitting force to said brake shoe supporting arms to apply said brake shoes whereby the frictionally controlled pivotal connection of said brake shoes to said arms may permit automatic adjustment of the brake shoes to the drum and will thereafter prevent displacement of said brake shoes upon said arms when they are withdrawn.

14. In combination with a vehicle having a pair of brakes each provided with a plurality of brake shoes, means for simultaneously actuating said brakes including frictional means adapted to cause simultaneous release of said brakes when the brake applying power is released and means for causing simultaneous removal of the brake shoes of each brake when the brake applying power is released.

15. In combination with a vehicle having a pair of brakes each provided with a plurality of brake shoes, equalizing means for simultaneously actuating said brakes including frictional means adapted to cause simultaneous release by said brakes when the brake applying power is released and frictional means for causing simultaneous removal of the brake shoes of each brake when the brake applying power is released.

16. Braking mechanism comprising a brake shoe and a coöperating braking surface, actuating means for forcing said brake shoe into engagement with said coöperating braking surface including a frictional means adapted to permit said shoe properly to engage said coöperating braking surface when the braking power is applied and operable to insure instant and complete removal of the shoe from said coöperating braking surface when the brake applying power is withdrawn, whereby uneven wear upon the brake shoe and dragging of the shoe is prevented.

17. Braking mechanism comprising a plurality of brake shoes, coöperating braking surfaces and actuating means for simultaneously forcing said shoes into engagement with said coöperating surface including frictional means adapted to permit said shoes properly to engage the coöperating braking surface when braking power is applied and operable to insure simultaneous removal of said brake shoes from the coöperating braking surface when the brake applying power is withdrawn.

In testimony whereof, I have signed my name to this specification.

RALPH M. LOVEJOY.